United States Patent
Sawa et al.

(10) Patent No.: US 6,371,886 B1
(45) Date of Patent: Apr. 16, 2002

(54) CONTROLLER FOR AUTOMATIC TRANSMISSION

(75) Inventors: Kenji Sawa; Mitsutoshi Abe; Yoshinori Fukumoto, all of Fuchu-cho (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/581,258

(22) PCT Filed: Oct. 29, 1999

(86) PCT No.: PCT/JP99/05999

§ 371 Date: Jun. 27, 2000

§ 102(e) Date: Jun. 27, 2000

(87) PCT Pub. No.: WO00/26562

PCT Pub. Date: May 11, 2000

(30) Foreign Application Priority Data

Oct. 30, 1998 (JP) ............................................ 10-310822

(51) Int. Cl.[7] ............................................... B60K 41/04
(52) U.S. Cl. ........................... 477/115; 701/52; 701/55; 477/116; 477/77
(58) Field of Search ................................. 477/115, 116, 477/70, 71, 77, 78, 118, 122, 123; 701/52, 53, 54, 55

(56) References Cited

U.S. PATENT DOCUMENTS 5,761,628 A    6/1998  Steeby et al. ............... 701/104

FOREIGN PATENT DOCUMENTS

| JP | 59-89857 | 5/1984 |
| JP | 61065949 A | 4/1986 |
| JP | 2-125174 | 5/1990 |
| JP | 3-118354 | 12/1991 |
| JP | 6-17911 | 1/1994 |

*Primary Examiner*—Sherry Estremsky
*Assistant Examiner*—Tisha D. Lewis
(74) *Attorney, Agent, or Firm*—Nixon Peabody LLP; Donald R. Studebaker

(57) ABSTRACT

There is provided temporary high-speed gear setting means which causes an automatic transmission to accomplish first-speed gear after it has once been set to second speed gear, for instance, which is selected as a specific high-speed gear upon switching from a non-drive range to the drive range. While it is made possible to manually switch between gear-shifting control operation in automatic mode performed according to preset shifting characteristics and manual mode in which gear-shifting operation is manually performed by a driver, priority is given to accomplishment of the first-speed gear the temporary high-speed gear setting means when the automatic transmission is switched to the manual mode while it is set to the aforementioned specific high-speed gear by the aforementioned temporary high-speed gear setting means.

5 Claims, 15 Drawing Sheets

FIG. 3

| | FORWARD CLUTCH (41) | 2-4 BRAKE (44) | 3-4 CLUTCH (43) | LOW REVERSE BRAKE (45) | REVERSE CLUTCH (42) | ONE-WAY CLUTCH (46) |
|---|---|---|---|---|---|---|
| 1ST GEAR | ◯ | | | | | ◯ |
| 2ND GEAR | ◯ | ◯ | | | | |
| 3RD GEAR | ◯ | | ◯ | | | |
| 4TH GEAR | | ◯ | ◯ | | | |
| REV. GEAR | | | | ◯ | ◯ | |

FIG. 4

| RANGE | D | | | | R |
|---|---|---|---|---|---|
| GEAR SETTING | 1ST GEAR | 2ND GEAR | 3RD GEAR | 4TH GEAR | |
| FIRST ON/OFF SV (111) | × | × | × | ○ | ○ |
| SECOND ON/OFF SV (112) | × | × | × | × | ○ |
| FIRST DUTY SV (121) | × | ○ | ○ | ○ | ○ |
| SECOND DUTY SV (122) | × | × | ○ | ○ | ○ |
| THIRD DUTY SV (123) | ○ | ○ | ○ | × | ○ |

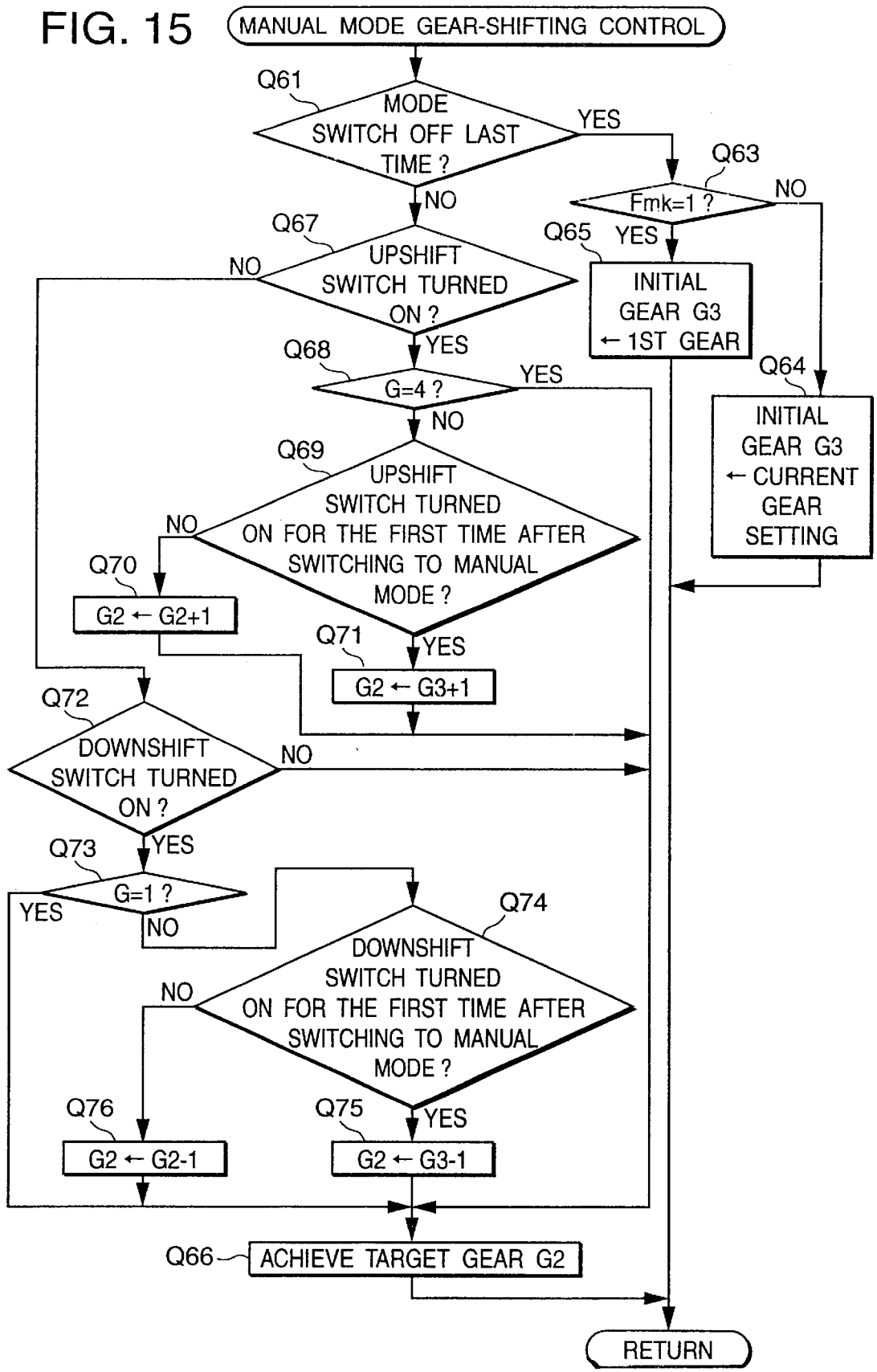

CONTROLLER FOR AUTOMATIC TRANSMISSION

TECHNICAL FIELD

This invention relates to a control device for an automatic transmission which is made switchable between automatic mode and manual mode by manual operation.

BACKGROUND ART

Among automatic transmissions, there is a type which allows manual switching between automatic mode, in which gear-shifting operation is performed according to preset shifting characteristics, and manual mode, in which gear-shifting operation is manually performed by a driver, in a drive range (refer to Japanese Unexamined Patent Publication No. 2-125174). When the transmission has been switched to the manual mode, gear setting which has been accomplished immediately before switching to the manual mode is usually maintained unless a shift is made in the manual mode thereafter.

Also among the automatic transmissions, there is a type in which the transmission is once set to a specific high-speed gear (e.g., third speed gear) other than first speed gear and then set to the first speed gear, instead of promptly setting to the first speed gear, to prevent or reduce shocks when gears have been changed from a non-drive range to a drive range to start off (Japanese Unexamined Patent Publication No. 61-065949).

It is considered feasible to combine the aforementioned two techniques such that the transmission can be manually switched between the automatic mode and the manual mode and set to first speed gear after once accomplishing a specific high-speed gear setting when gears have been changed from a non-drive range to a drive range.

Assuming that such a combination has been made, a certain driver may switch an automatic transmission to the manual mode immediately after switching it from a non-drive range to a drive range on some occasions. In such a case, the driver would think that the automatic transmission has been set to the first speed gear when switched to the drive range because his or her vehicle is now starting off, and later manual shifting would be made on the assumption that the current gear setting is the first speed gear.

If, however, the transmission is switched to the manual mode while it is in a specific high-speed gear selected when the transmission has been switched to the drive range, and the gear setting accomplished immediately before switching to the manual mode is maintained, the gear setting thus maintained would be the aforementioned specific high-speed gear and this would cause a loss of opportunity to accomplish the first speed gear by way of the specific high-speed gear. In addition, the driver might perform manual operation based on a misunderstanding that the transmission is currently maintained at the first speed gear despite the fact that it is actually The present invention has been made in consideration of the aforementioned situations, and its object is to provide a control device for an automatic transmission which can avoid such a situation that the transmission, which is designed to be set to first speed gear after it has once been set to a specific high-speed gear when switched to a drive range, is maintained at the specific high-speed gear when the transmission is switched to manual mode while it is in the specific high-speed gear.

DISCLOSURE OF THE INVENTION

According to the invention, a control device for an automatic transmission which is made manually switchable between automatic mode, in which gear-shifting operation is performed according to preset shifting characteristics, and manual mode, in which gear-shifting operation is manually performed by a driver, in a drive range comprises temporary high-speed gear setting means which causes the automatic transmission to accomplish first-speed gear after it has once been set to a specific high-speed gear other than first speed gear when switched from a non-drive range to the drive range, and priority means which gives priority to accomplishment of the first-speed gear by the aforementioned temporary high-speed gear setting means when the automatic transmission is switched to the aforementioned manual mode while it is set to the aforementioned specific high-speed gear by the aforementioned temporary high-speed gear setting means.

BRIEF DESCRIPTION OF THE DRAWINGS

FIG. 3 is a diagram showing a relationship between working conditions of frictional engagement elements and gear settings of the automatic transmission shown in FIG. 1;

FIG. 4 is a diagram showing a relationship between operating conditions of solenoid valves of the hydraulic circuit shown in FIG. 2 and the gear settings;

FIG. 15 is a flowchart showing an example of control operation according to the present invention.

BEST MODE FOR CARRYING OUT THE INVENTION

Figure 1:
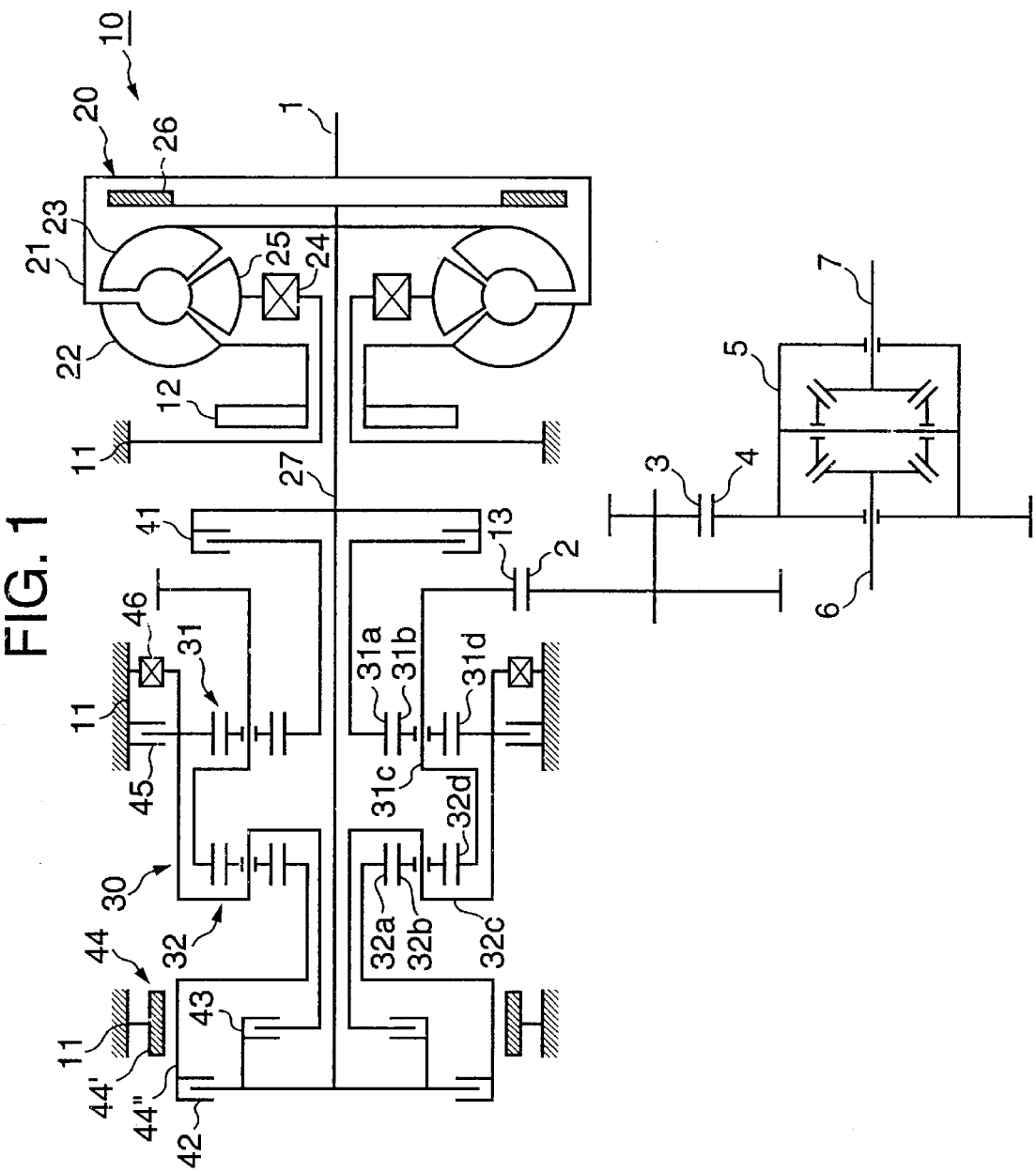
FIG. 1 is a skeleton drawing showing the mechanical construction of an automatic transmission to which the present invention is applied.

First, the mechanical construction of an automatic transmission 10 according to the present embodiment is described referring to FIG. 1.

This automatic transmission 10 has as its principal constituent elements a torque converter 20, a shift mechanism 30 which is driven by output of the torque converter 20, a plurality of frictional engagement elements 41–45, such as a clutch and brake, which switch a power transmission path of the shift mechanism 30, and a one-way clutch 46. The automatic transmission 10 is made such that it allows the selection of first to fourth speed gears in a D range (forward drive range) and reverse gear in an R range.

The aforementioned torque converter 20 is constructed of a pump 22 fixed in a case 21 which is connected to an engine output shaft 1, a turbine 23 which is placed face to face with the pump 22 and driven by the pump 22 via hydraulic oil, a stator 25 which is provided between the pump 22 and the turbine 23 and supported by a transmission case 11 via a one-way clutch 24 to perform a torque multiplication function, and a lockup clutch 26 which is provided between the aforementioned case 21 and the turbine 23 to directly connect the engine output shaft 1 to the turbine 23 via the case 21. In this construction, rotary motion of the aforementioned turbine 23 is output to the side of the shift mechanism 30 via a turbine shaft 27.

Further, an oil pump 12 which is driven by the engine output shaft 1 via the case 21 of the torque converter 20 is provided on one side of the torque converter 20 opposite to an engine.

On the other hand, the shift mechanism 30 is constructed of first and second planetary gear mechanisms 31, 32 each having a sun gear 31a, 32a, a plurality of pinions 31b, 32b which are engaged with the respective sun gears 31a, 32a, a pinion carrier 31c, 32c supporting the respective pinions 31b, 32b, and an internal gear 31d, 32d which are engaged with the respective pinions 31b, 32b.

There are also provided a forward clutch 41 between the aforementioned turbine shaft 27 and the sun gear 31a of the first planetary gear mechanism 31, a reverse clutch 42 between the turbine shaft 27 and the sun gear 32a of the second planetary gear mechanism 32, a 3–4 clutch 43 between the turbine shaft 27 and the pinion carrier 32c of the second planetary gear mechanism 32, as well as a 2–4 brake 44 for fixing the sun gear 32a of the second planetary gear mechanism 32.

Further, the internal gear 31d of the first planetary gear mechanism 31 and the pinion carrier 32c of the second planetary gear mechanism 32 are linked to each other, and between these elements and the transmission case 11, a low reverse brake 45 and the one-way clutch 46 are placed parallel to each other. Also, the pinion carrier 31c of the first planetary gear mechanism 31 and the internal gear 32d of the second planetary gear mechanism 32 are linked to each other, and an output gear 13 is connected these elements. Rotary motion of this output gear 13 is transmitted to left and right axles 6, 7 via transmission gears 2, 3, 4 and a differential mechanism 5.

Here, a relationship between working conditions of the frictional engagement elements 41–45, such as the aforementioned individual clutches and brakes, and the one-way clutch 46 and gear settings is depicted in FIG. 3, in which each "○" symbol represents a case where the relevant frictional engagement elements are meshed together.

Next, a hydraulic control circuit 100 which supplies working pressure to and releases it from hydraulic chambers provided for the aforementioned individual frictional engagement elements 41–45 is explained.

Among the aforementioned frictional engagement elements, the 2–4 brake 44 for the second and fourth speed gears which is made of a band brake has an apply chamber 44a and a release chamber 44b as hydraulic chambers to which the working pressure is supplied. The 2–4 brake 44 is applied when the working pressure is supplied only to the apply chamber 44a, while the 2–4 brake 44 is released when the working pressure is supplied only to the release chamber 44b, when the working pressure is not supplied to either of both chambers 44a, 44b, or when the working pressure is supplied to both chambers 44a, 44b. The other frictional engagement elements 41–43, 45 each have a single hydraulic chamber and are caused to engage when the working pressure is supplied the relevant hydraulic chamber.

Figure 2:
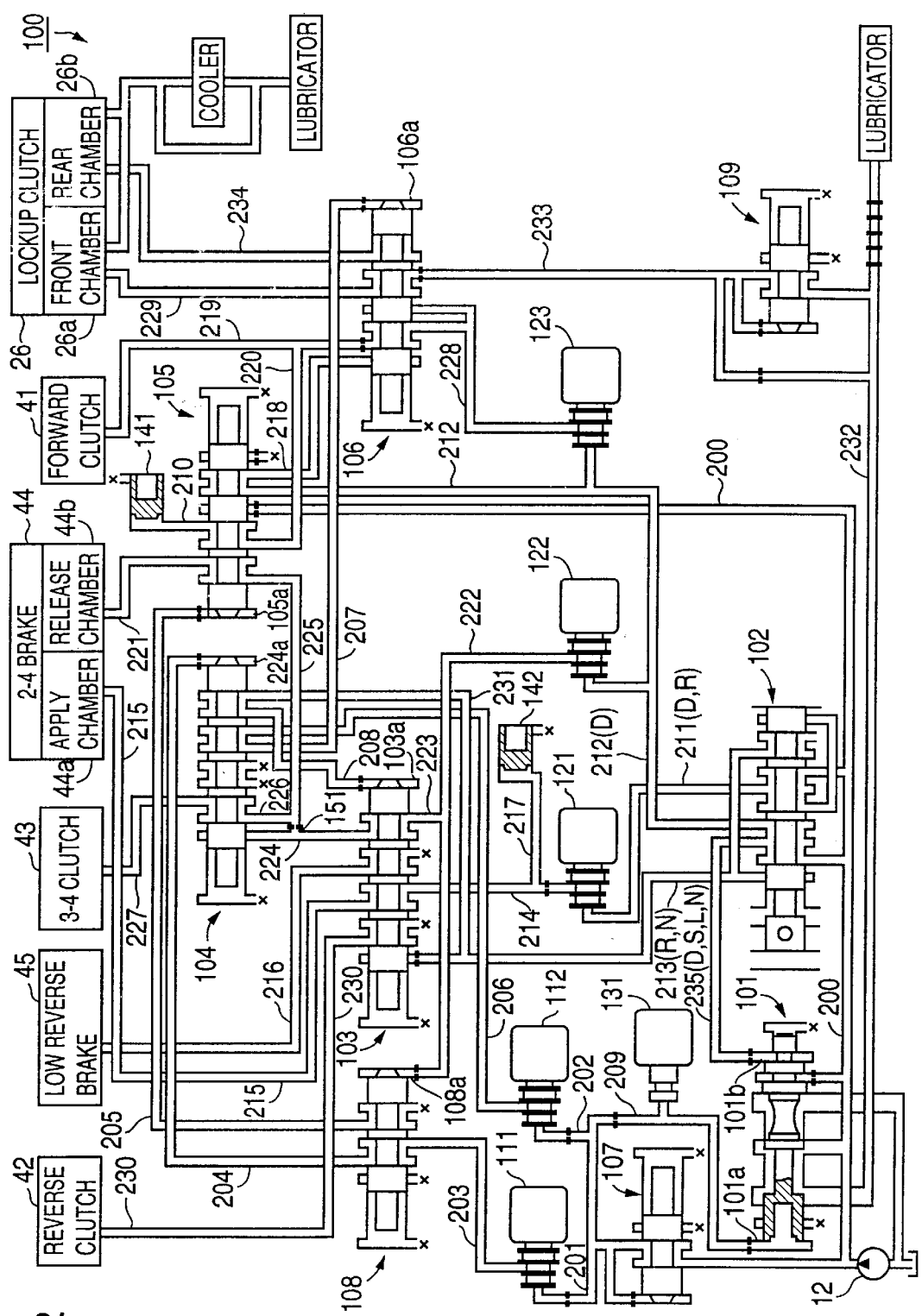
FIG. 2 is a diagram showing an example of an hydraulic circuit of the automatic transmission shown in FIG. 1.

As shown in FIG. 2, this hydraulic control circuit 100 has as its principal constituent elements a regulator valve 101 for producing line pressure, a manual valve 102 for manually switching the range, a low reverse valve 103 which is activated during gear-shifting operation for switching hydraulic channels to the individual frictional engagement elements 41–45, a bypass valve 104, a 3–4 shift valve, a lockup shift valve 106, first and second on/off solenoid valves (hereinafter referred to as the on/off SVs) 111, 112 for actuating these valves 103–106, a solenoid reducing valve (hereinafter referred to as the reducing valve) 107 which produces source pressure to be supplied to these on/off SVs 111, 112, a solenoid relay valve (hereinafter referred to as the relay valve) 108 which switches destination of working pressure fed from the first on/off SV 111, first to third duty solenoid valves (hereinafter referred to as the duty SVs) 121, 122, 123 which control such operations as production, regulation and release of the working pressure delivered to the hydraulic chambers for the individual frictional engagement elements 41–45, etc.

The aforementioned on/off SVs work in such a manner that when one on/off SV is ON, it connects hydraulic channels on its upstream and downstream sides to each other, and when the on/off SV is OFF, it closes off the hydraulic channel on the upstream side and drains the hydraulic channel on the downstream side. Also, the duty SVs 121–123 work in such a manner that when one duty SV is OFF, that is, when its duty factor (ratio of ON time to one ON-OFF period) is 0%, the relevant duty SV is fully opened and thereby connects channels on its upstream and downstream sides to each other, and when the duty SV is ON, that is, when its duty factor is 100%, it closes off the hydraulic channel on the downstream side and drains the hydraulic channel on the downstream side. Also at a duty factor between 0% and 100%, the relevant duty SV makes hydraulic pressure on the upstream side equal to source pressure and produces a hydraulic pressure which is regulated to a value corresponding to the duty factor on the downstream side.

The aforementioned regulator valve 101 regulates the pressure of hydraulic oil output from the oil pump 12 to a specified line pressure. This line pressure is supplied to the aforementioned manual valve 102 via a main line 200 as well as to the aforementioned reducing valve 107 and the 3–4 shift valve 105.

The line pressure supplied to the reducing valve 107 is decreased by the valve 107 to a fixed pressure, which is then supplied to the first and second on/off SVs 111, 112 via lines 201, 202, respectively.

When the first on/off SV 111 is ON, this fixed pressure is supplied to the aforementioned relay valve 108 via a line 203, and when a spool of the relay valve 108 is located to the right as illustrated in the Figure (this applied also to the following discussion) the fixed pressure is further supplied as pilot pressure to a control port 104a at one end of the bypass valve 104 via a line 204, thereby forcing a spool of the bypass valve 104 leftward. Also, when the spool of the relay valve 108 is located to the left, the fixed pressure is supplied as pilot pressure to a control port 105a at one end of the 3–4 shift valve 105 via a line 205, thereby forcing a spool of the 3–4 shift valve 105 rightward.

When the second on/off SV 112 is ON, the fixed pressure from the reducing valve 107 is supplied to the bypass valve 104 via a line 206, and when the spool of the bypass valve 104 is located to the right the fixed pressure is further supplied as pilot pressure to a control port 106a at one end of the lockup shift valve 106 via a line 207, thereby forcing a spool of the shift valve 106 leftward. Also, when the spool of the bypass valve 104 is located to the left, the aforementioned fixed pressure is supplied as pilot pressure to a control port 103a at one end of the low reverse valve 103 via a line 208, thereby forcing a spool of the hydraulic control circuit 100 leftward.

Further, the fixed pressure from t he r educing valve 107 is also supplied to a pressure-regulating port 101a of the aforementioned regulator valve 101 via a line 209. In this case, the fixed pressure is regulated by a linear solenoid valve (hereinafter referred to as the linear SV) 131 provided in the aforementioned line 209 according to throttle opening of the engine, for instance. Thus, the line pressure is regulated according to the throttle opening, for instance.

The main line 200 connected to the aforementioned 3–4 shift valve 105 is linked to a first accumulator 141 via a line 210 and introduces the line pressure to the accumulator 141 when the spool of the valve 105 is located to the right.

On the other hand, the line pressure supplied through the main line 200 to the manual valve 102 is introduced into a first output line 211 and a second output line 212 in the D range, into the first output line 211 and a third output line 213 in the R range, and into the third output line 213 alone in an N range.

The aforementioned first output line 211 is linked to the first duty SV 121 and supplies the line pressure as control source pressure to the first duty SV 121. A downstream side of this first duty SV 121 is linked to the low reverse valve 103 via a line 214, and when a spool of the valve 103 is located to the right, the downstream side of the first duty SV 121 is further connected to the apply chamber 44a of the 2–4 brake 44 via a line 215. Also, when the spool of the low reverse valve 103 is located to the left, the downstream side of the first duty SV 121 is connected to the hydraulic chamber of the low reverse brake 45 via a line 216

A line 217 branches out from the aforementioned line 214 connects to a second accumulator 142.

The aforementioned second output line 212 is connected to the second duty SV 122 and the third duty SV 123 and supplies the line pressure as control source pressure to these duty SVs 122, 123. The second output line 212 is also connected to the 3–4 shift valve 105. When the spool of the valve 105 is located to the left, the second output line 212 thus connected to the 3–4 shift valve 105 is linked to the lockup shift valve 106 via a line 218, and when the spool of the valve 106 is located to the left, the second output line 212 is further linked to the hydraulic chamber of the forward clutch 41 via a line 219.

When the spool of the valve 105 is located to the left, a line 220 branching out from the aforementioned line 219 is led to the first accumulator 141 via the aforementioned line 210, and when the spool of the valve 105 is located to the right, the line 220 is linked to the release chamber 44b of the 2–4 brake 44 via a line 221.

Further, a downstream side of the aforementioned second duty SV 122 to which the control source pressure is supplied through the second output line 212 is linked to a control port 108a at one end of the aforementioned relay valve 108 via a line 222 and supplies pilot pressure, thereby forcing the spool of the relay valve 108 leftward.

Further, a line 223 branching out from the aforementioned line 222 is led to the low reverse valve 103 and further connected to a line 224 when the spool of the valve 103 is located to the right. From this line 224, a line 225 branches out via an orifice 151 and is led to the 3–4 shift valve 105. When the spool of the 3–4 shift valve 105 is located to the left, the line 225 is linked to the release chamber 44b of the 2–4 brake 44 via the line 221.

From the line 225 which is branched from the aforementioned line 224 via the orifice 151, a line 226 further branches out and is led to the bypass valve 104. When the spool of the valve 105 is located to the right, the line 226 is linked to the hydraulic chamber of the 3–4 clutch 43 via a line 227.

Further, the aforementioned line 224 is led directly to the bypass valve 104, and when the spool of the valve 104 is located to the left, the line 224 is connected to the line 225 via the aforementioned line 226. This means that the line 224 and the line 225 are connected to each other bypassing through the aforementioned orifice 151.

Also, a downstream side of the aforementioned third duty SV 123 to which the control source pressure is supplied through the second output line 212 is connected to the lockup shift valve 106 via a line 228 and, when the spool of the valve 106 is located to the right, linked to the line 219 which is connected to the hydraulic chamber of the aforementioned forward clutch 41. Also when the spool of the lockup shift valve 106 is located to the left, the downstream side of the third duty SV 123 is linked to a front chamber 26a of the lockup clutch 26 via a line 229.

Further, the third output line 213 branching out from the manual valve 102 is led to the low reverse valve 103 and supplies the line pressure to the valve 103. The line pressure is introduced into the hydraulic chamber of the reverse clutch 42 when the spool of the valve 103 is located to the left.

Also, a line 231 branching out from the third output line 213 is led to the bypass valve 104. When the spool of the valve 104 is located to the right, the line 231 supplies the line pressure to the control port 103a of the low reverse valve 103 as pilot pressure via the aforementioned line 208, thereby forcing the spool of the low reverse valve 103 leftward.

In addition to the above-described construction, the present hydraulic control circuit 100 is provided with a converter relief valve 109. This valve 109 regulates the working pressure supplied from the regulator valve 101 through a line 232 to a fixed pressure and, then, supplies the fixed pressure to the lockup shift valve 106 through a line 233. When the spool of the lockup shift valve 106 is located to the right, this fixed pressure is supplied to the front chamber 26a of the lockup clutch 26 through the aforementioned line 229, and when the spool of the lockup shift valve 106 is located to the left, the fixed pressure is supplied to a rear chamber 26b of the lockup clutch 26 through a line 234.

The lockup clutch 26 is so constructed that it is released as the aforementioned fixed pressure is supplied to the front chamber 26a, and is engaged as the fixed pressure is supplied to the rear chamber 26b. In a case where the spool of the lockup shift valve 106 is located to the left when the lockup clutch 26 is engaged, a locking force corresponding to working pressure produced by the aforementioned third duty solenoid valve 123 is obtained as the working pressure is supplied to the front chamber 26a.

While this hydraulic control circuit 100 constructed such that the line pressure regulated by the regulator valve 101 is controlled by control pressure fed from the linear SV 131 to hydraulic pressure according to the throttle opening, for instance, as discussed earlier, the hydraulic control circuit 100 also controls the line pressure according to range setting. Specifically, a line 235 which is branched from the aforementioned manual valve 102 and linked to the main line 200 in the D and N ranges is connected to a pressure-reducing port 101b of the regulator valve 101 such that a regulated pressure value of the line pressure is made smaller in the D and N ranges than in the R range.

Figure 5:
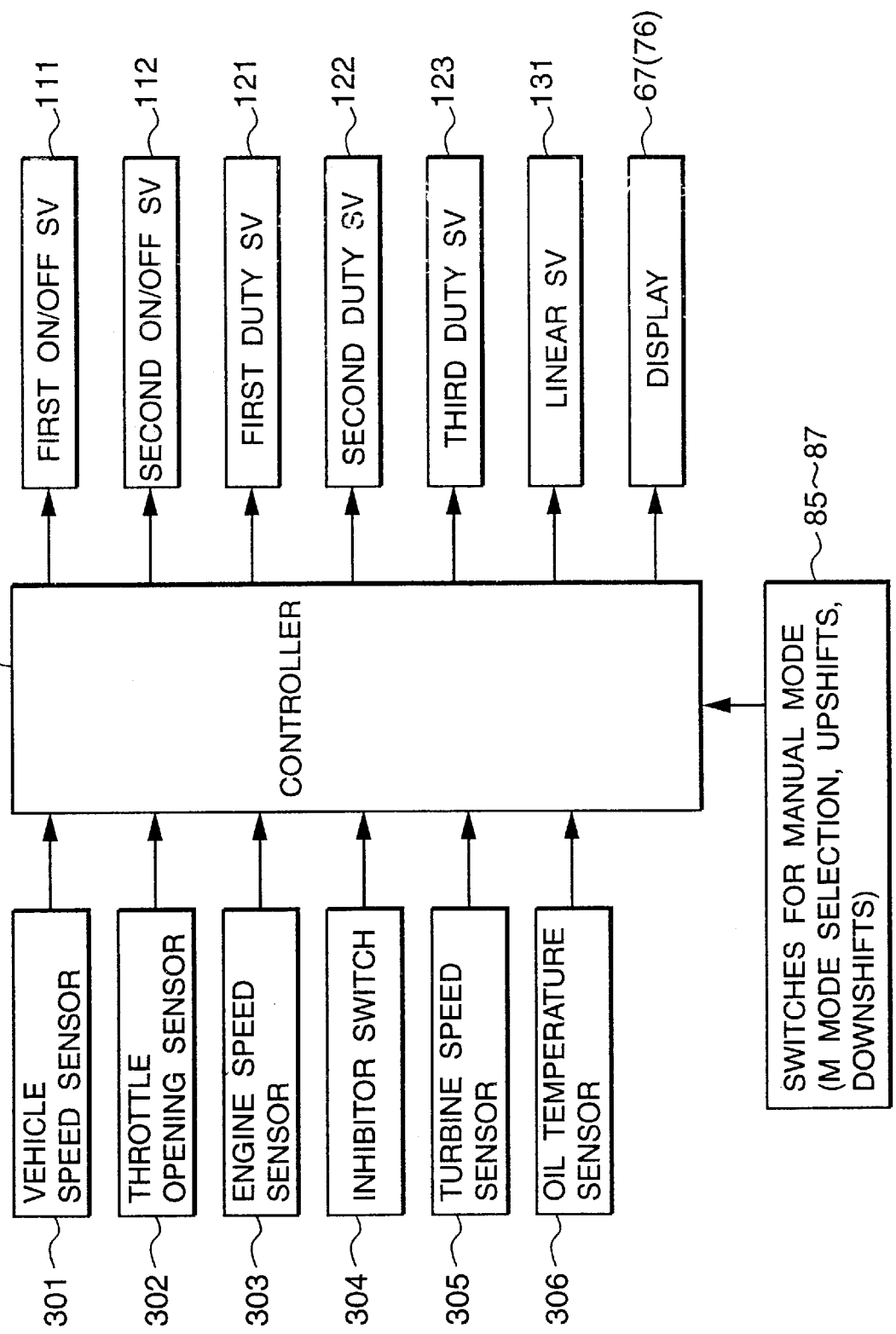
FIG. 5 is a diagram showing an example of a control system of the present invention.

On the other hand, there is provided a controller 300 which controls the aforementioned first and second on/off SVs 111, 112, the first to third duty SVs 121–123 and the linear SV 131 of the hydraulic control circuit 100 as shown in FIG. 5.

Entered to this controller 300 are signals from a vehicle speed sensor 301 which detects the speed of a vehicle, a throttle opening sensor 302 which detects the throttle opening as a reference of engine load, an engine speed sensor 303 which detects engine speed, an inhibitor switch 304 which detects the range selected by a driver, a turbine speed sensor 305 which detects the rotational speed of the turbine shaft 27, that is, an input rotational speed entered from the torque converter 20 to the shift mechanism 30, and an oil temperature sensor 306 which detects the temperature of the hydraulic oil. The controller 300 is constructed such that it controls operation of the aforementioned on/off SVs 111, 112, the duty SVs 121–123 and the linear SV 131 according to operating conditions of the vehicle or the engine indicated by the signals from these sensors and switch 301–306.

A relationship (solenoid pattern) between states of control operation of the on/off SVs 111, 112 and the duty SVs 121–123 performed by the controller 300 and gear settings is summarized in FIG. 4.

In FIG. 4, each "○" symbol represents an ON state of the on/off SVs 111, 112 and an OFF state of the duty SVs 121–123. For any of these solenoid valves, each "○" symbol indicates a condition in which a hydraulic channel on the upstream side is connected to a hydraulic channel on the downstream side so that source pressure is directly supplied to the downstream side. Also, each "×" symbol represents an OFF state of the on/off SVs 111, 112 and an ON state of the duty SVs 121–123. For any of these solenoid valves, each "×" symbol indicates a condition in which a hydraulic channel on the upstream side is closed off and a hydraulic channel on the downstream side is drained. The frictional engagement elements shown in FIG. 3 are individually engaged at each gear setting according to the solenoid pattern shown in FIG. 4.

Figure 6:
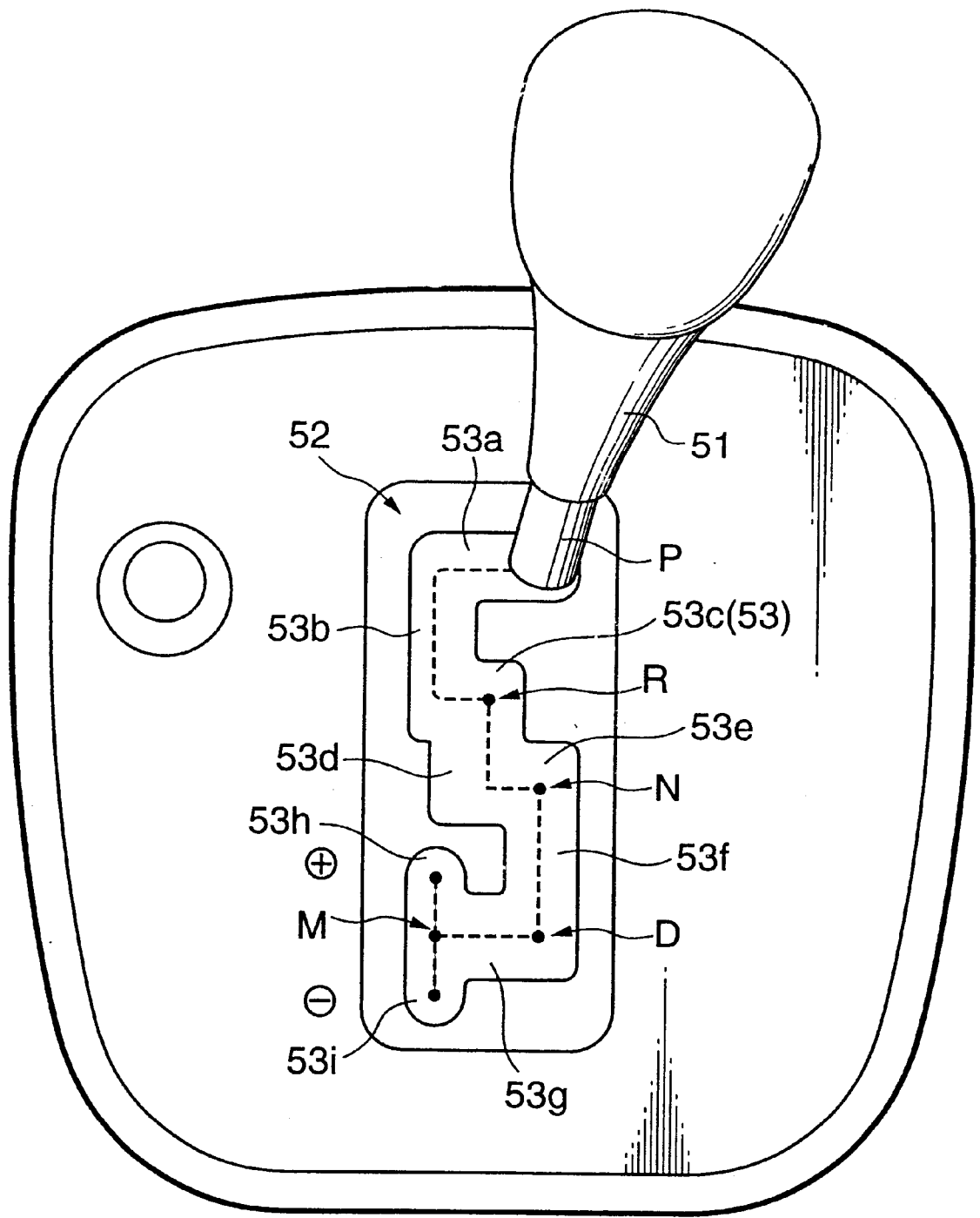
FIG. 6 is a top view showing a shift lever used for changing range positions and switching between automatic mode and manual mode together with a shift gate.
Figure 7:
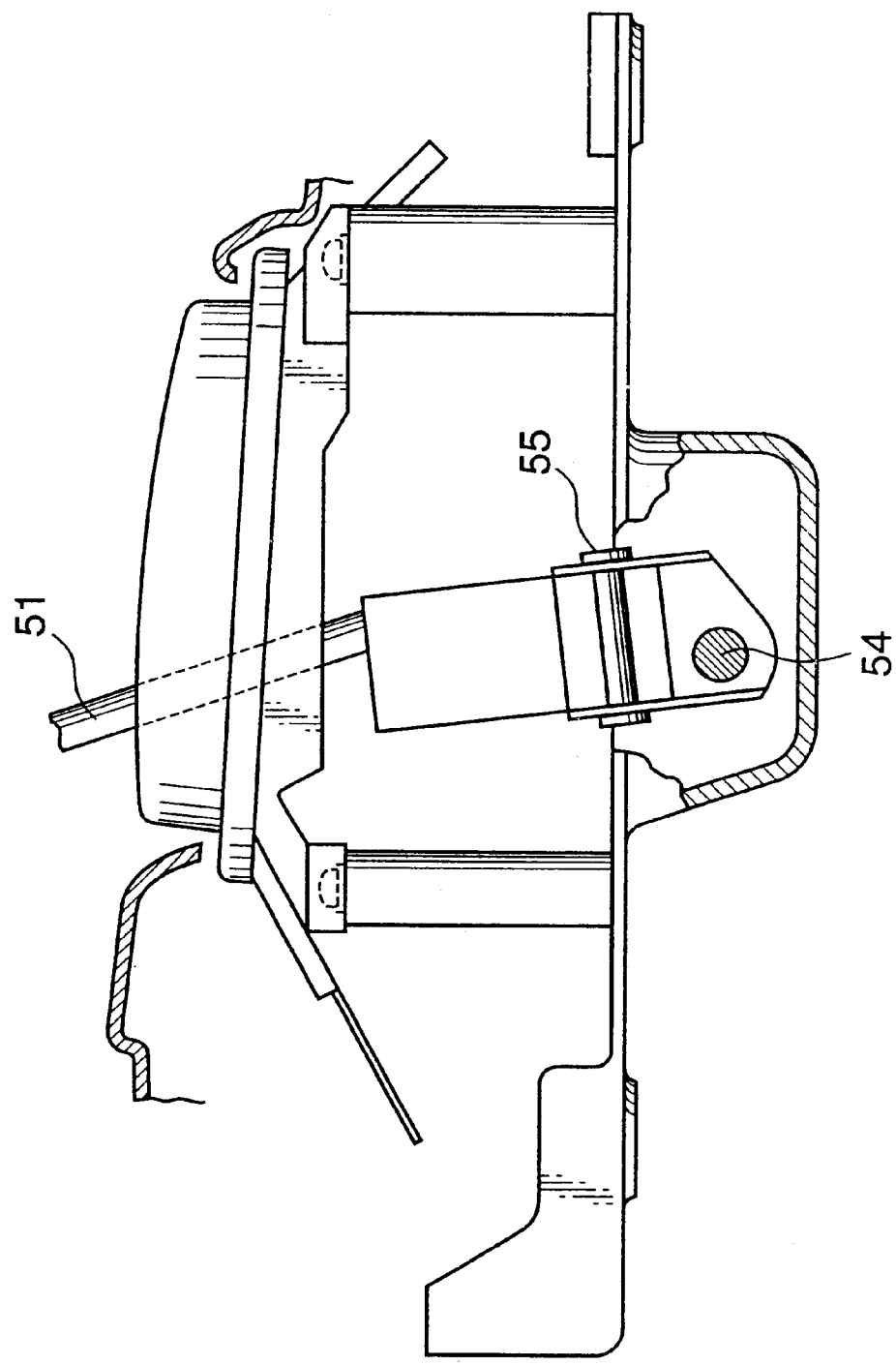
FIG. 7 is a simplified cross-sectional side view of FIG. 6.

FIGS. 6 and 7 show an exemplary construction of a portion used for manually changing range positions, switching between automatic mode in which gear-shifting control operation is performed according to preset shifting characteristics and manual mode in which gear-shifting operation is manually performed, and entering commands for a one-step upshift and one-step downshift in the manual mode. In these Figures, the numeral 51 indicates a shift lever which is made movable frontward, rearward, leftward and rightward along a gearshift guideway 53 formed in a gate plate 52. In FIG. 7, a longitudinal shift pivot is indicated by the reference numeral 54 and a lateral shift pivot is indicated by the reference numeral 55.

The aforementioned gearshift guideway 53 is formed of a plurality of guideway segments 53a–53i. Specifically, assuming a condition in which the shift lever 51 is set in a P range shown in FIG. 6, the gearshift guideway 53 is formed of the first guideway segment 53a extending leftward (to the left side of the vehicle) from the P range position as illustrated in FIG. 6, the second guideway segment 53b extending rearward (downward as illustrated in FIG. 6) from a left end of the segment 53a, a third guideway segment 53c extending rightward from a rear end of the segment 53b, a fourth guideway segment 53d extending rearward from a right end of the segment 53c, a fifth guideway segment 53e extending rightward from a rear end of the segment 53d, a sixth guideway segment 53f extending rearward from a right end of the segment 53e, a seventh guideway segment 53g extending leftward from a rear end of the segment 53f, an eighth guideway segment 53h extending frontward from a left end of the segment 53g, and a ninth guideway segment 53i extending rearward from the left end of the segment 53g.

A relationship between positions of the shift lever 51 in the gearshift guideway 53 and individual ranges is depicted in FIG. 6, in which the letter "P" indicates a P range select position, the letter "R" indicates an R range select position, the letter "N" indicates an N range select position, the letter "D" indicates a forward drive range select position, and the letter "M" indicates a manual mode select position. Swinging the shift lever 51 forward from the manual mode select position M produces a one-step upshift command, while swinging the shift lever 51 rearward from the manual mode select position M produces a one-step downshift command.

Figure 8:
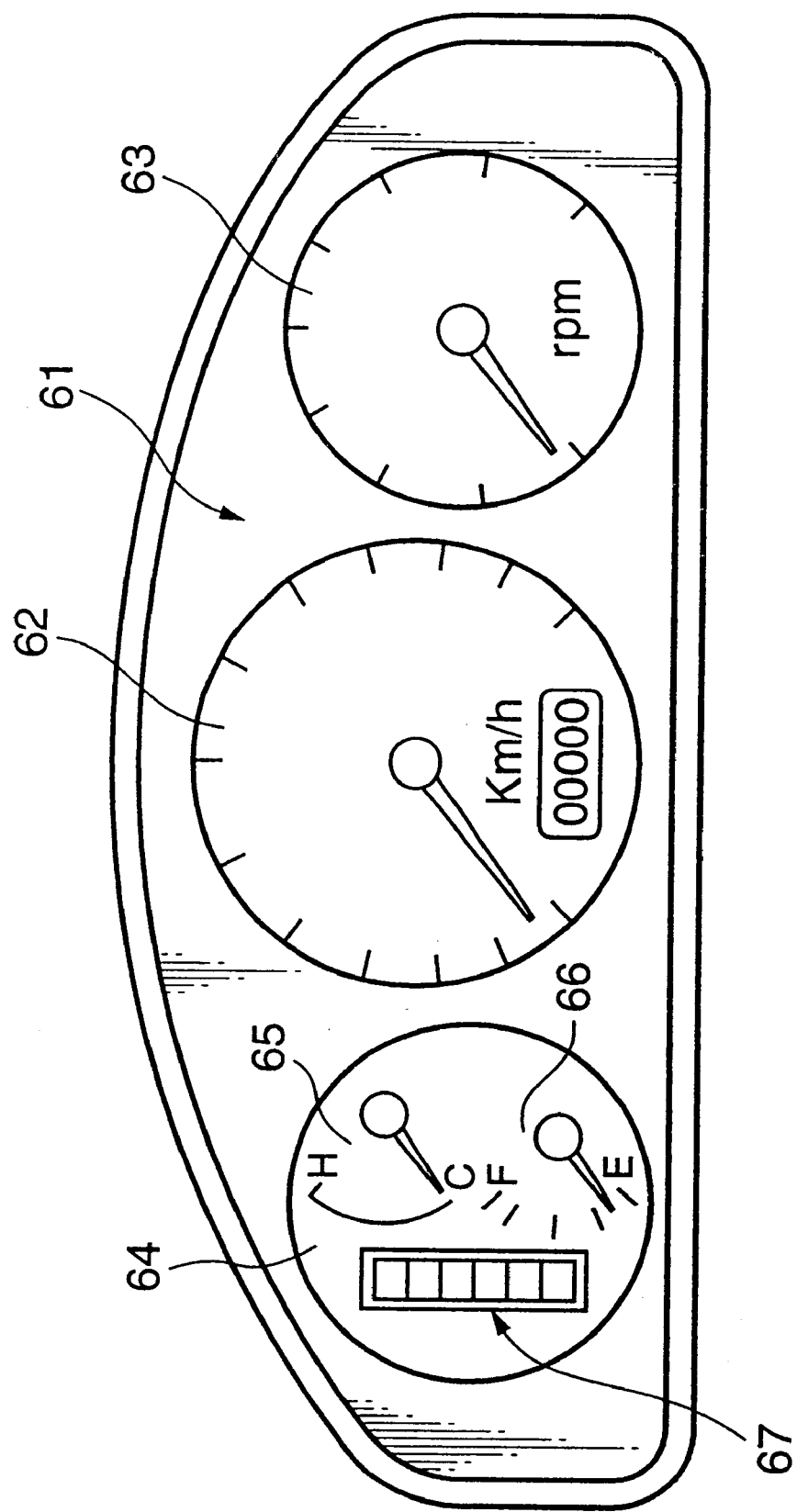
FIG. 8 is a diagram showing an example of a gearshift status display.
Figure 9:
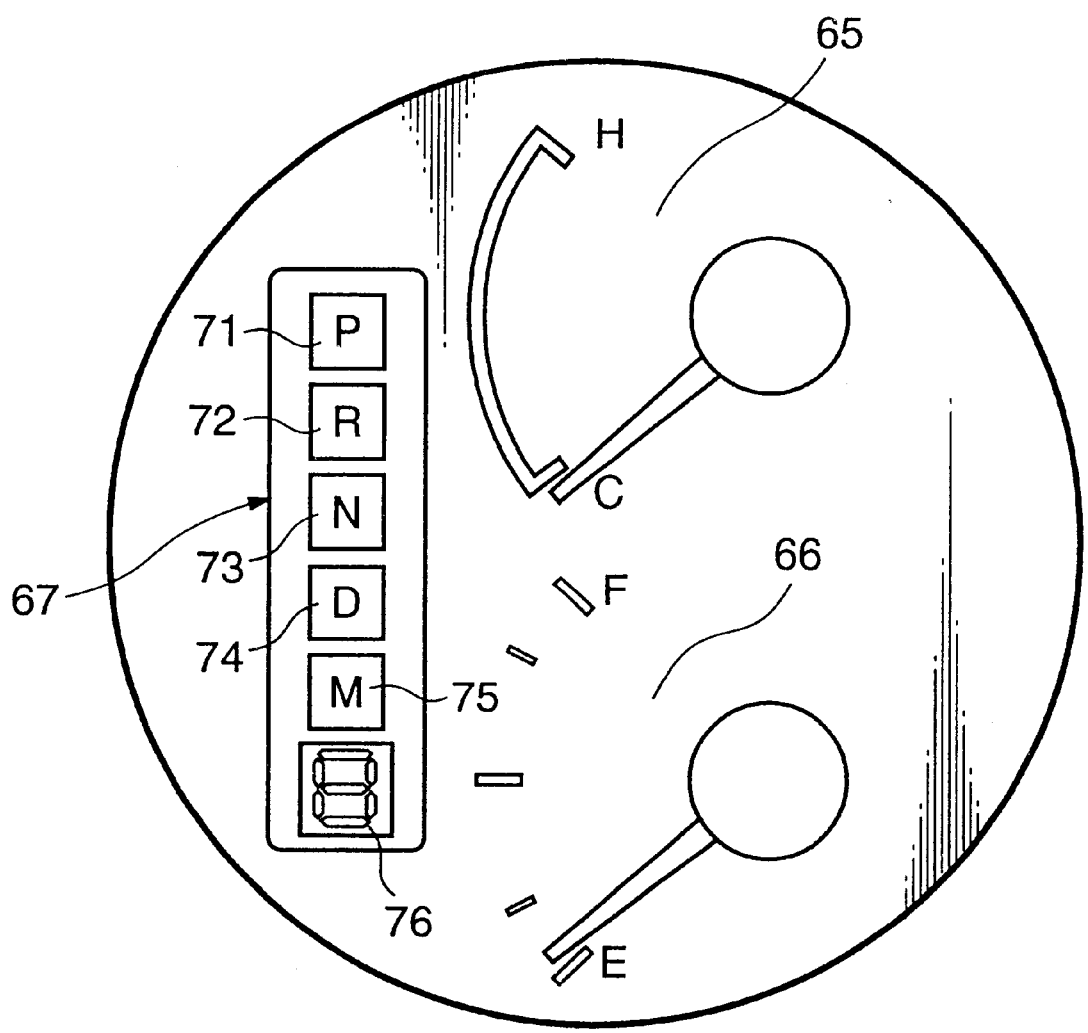
FIG. 9 is an enlarged view of a principal portion of FIG. 8.
Figure 10:
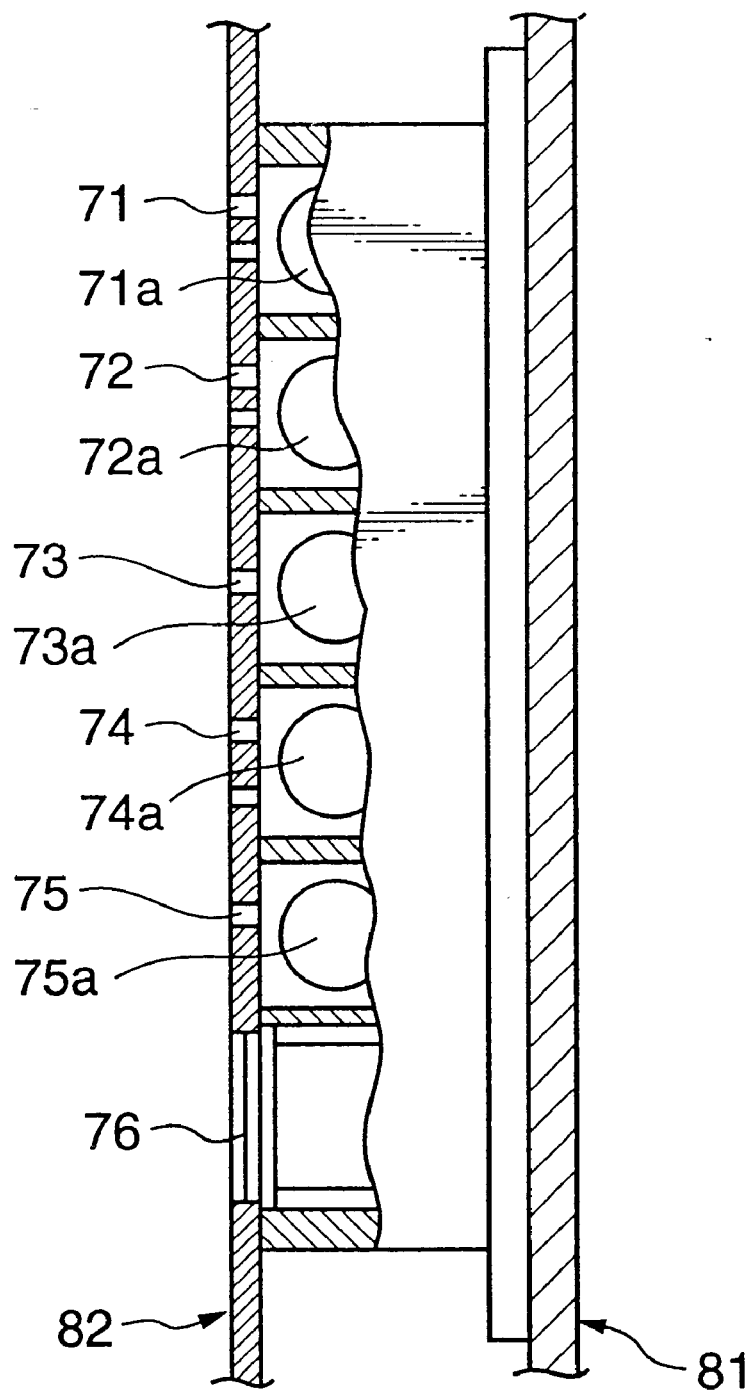
FIG. 10 is a fragmentary cross-sectional side view of the gearshift status display.

FIGS. 8–10 show a gearshift status display for indicating a current range select position (including the M range position for the manual mode) and current gear setting when the manual mode is selected. Specifically, a meter panel 61 is provided with a speedometer 62, a tachometer 63 for indicating the engine speed, as well as a combination meter 64. This combination meter 64 incorporates, in addition to a water temperature meter 65 and a fuel meter 66, the gearshift status display 67.

The gearshift status display 67 includes from top to bottom in the following order a P range indicator 71 which is lit when the P range is selected, an R range indicator 72 which is lit when the R range is selected, an N range indicator 73 which is lit when the N range is selected, a D range indicator 74 which is lit when the D range is selected, an M range indicator 75 which is lit when the M range (manual mode) is selected, and an 8-segment gear setting indicator 76 which indicates a currently effective gear setting when the manual mode is selected.

Referring to FIG. 10, designated by the numeral 81 is a mounting board, and there is provided a front panel 82 which is made capable of transmitting light and mounted parallel to the mounting board 81 with a specific distance therefrom. The space between the mounting board 81 and the front panel 82 is divided into multiple space segments in a vertical direction corresponding to the aforementioned individual indicators 71–76, and indicator lamps 71a–75a corresponding to the aforementioned indicators 71–75 are accommodated in the individual space segments. The gear setting indicator 76 is formed of a liquid crystal display which shows one of numerals 1 through 4 depending on which gear setting is currently selected.

Figure 11:
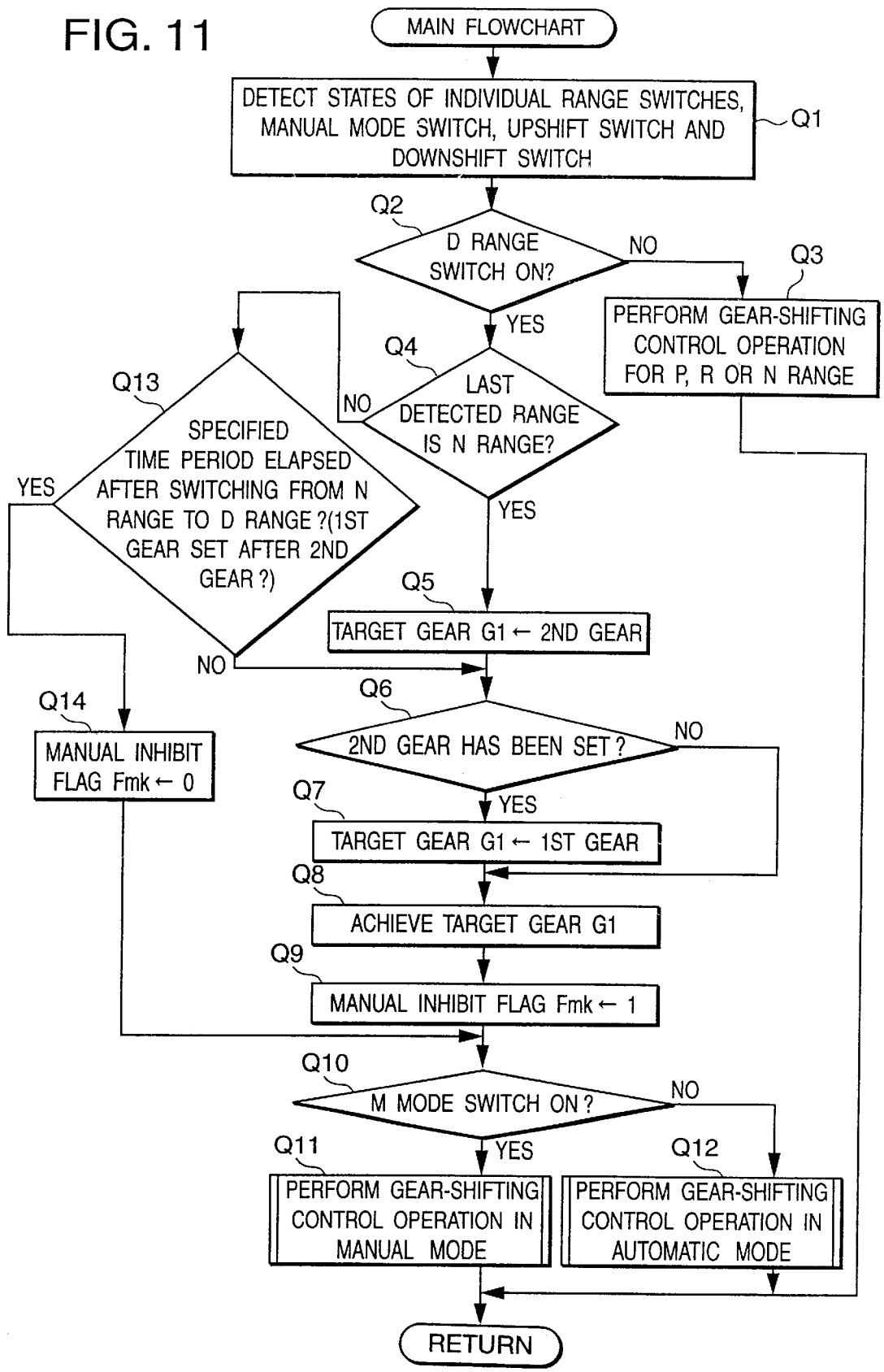
FIG. 11 is a flowchart showing an example of control operation according to the present invention.

FIG. 11 and the following Figures show details of gear-shifting control operation performed by the controller 300 which configured by use of a microcomputer. The controller 300 controls the lighting of the aforementioned gearshift status display 67. Thus, signals from a switch 85 which becomes ON when the manual mode is selected, a switch 86 which becomes ON when an upshift command is given in the manual mode, and a switch 97 which becomes ON when an downshift command is given in the manual mode are entered to the controller 300.

The controller 300 has a function of temporary high-speed gear setting means which causes the automatic transmission 10 to accomplish first-speed gear after it has once been set to a specific high-speed gear other than the first speed gear when switched from a non-drive range to the drive range.

Although the controller 300 is set such that the automatic transmission 10 is set to the first speed gear after it has once been set to second speed gear, the specific high-speed gear, when switched from the non-drive range to the drive range in an example shown in flowcharts, it is possible to select third speed gear or fourth speed gear as the specific high-speed gear instead of the second speed gear. A major consideration in the choice of the specific high-speed gear is to select gear setting which gives least shocks. In the shift mechanism of this embodiment, the second speed gear gives minimal shocks. More specifically, if a frictional engagement element (e.g., the 3–4 clutch 43) for joining together an torque converter output shaft which rotates when the vehicle is stopped and the shift mechanism which is not turned when the vehicle is stopped is engaged, the torque converter output shaft is forcibly stopped to rotate and inertial torque that then occurs causes considerable shocks at the time of switching to the drive range. Therefore, it is preferable to select gear setting in which a frictional engagement element which will not stop the rotary motion of the torque converter output shaft when engaged.

If the selected gear setting is a gear setting in which transmission of power from the side of an output shaft of the automatic transmission to the engine side is impossible when the frictional engagement element is engaged, that is, if gear setting in which engine braking is ineffective due to operation of the one-way clutch, for instance, rolling of a power unit, should it occur due to engagement of the frictional engagement element, will cause the power unit to roll in an opposite direction as a result of reaction to the initial rolling motion, thereby making the power unit unstable and producing discomfort to vehicle occupants. If the selected gear setting is a gear setting in which engine braking works, unstable conditions of the power unit can be avoided. Considering the above points altogether, the second speed gear is selected as the specific high-speed gear in this embodiment.

Based on the foregoing, the controller 300 further has a function of priority means which gives priority to accomplishment of the first-speed gear by the temporary high-speed gear setting means when the automatic transmission 10 is switched to the manual mode while it is set to the aforementioned specific high-speed gear by the aforementioned temporary high-speed gear setting means. In the example shown in the flowcharts, the controller 300 has a function of gear setting holding means which maintains gear setting accomplished immediately before switching to the manual mode until manual gear-shifting operation is performed by the driver when the automatic transmission 10 has been switched from the automatic mode to the manual mode, as well as a function of hold inhibiting means which inhibits retention of the gear setting by the aforementioned gear setting holding means while the automatic transmission 10 is set to the specific high-speed gear by the aforementioned temporary high-speed gear setting means. The aforementioned priority means is formed of this hold inhibiting means. Gear shifting in the manual mode is also prohibited while the automatic transmission 10 is set to the specific high-speed gear by the aforementioned temporary high-speed gear setting means.

The flowcharts of FIG. 11 and later including these functions are now explained.

First, signals from switches and other elements are read in in Q1 ("Q" hereinafter represents a step) of FIG. 11 and, then, a judgment is made in Q2 to determine whether the D range is currently selected. If the judgment result in Q2 is negative, gear-shifting control operation for the P, R or N range whichever applicable is performed in Q3. If the judgment result in Q2 is affirmative, a further judgment is made in Q4 to determine whether the last detected range was the N range. In other words, a judgment is made to determine whether the transmission 10 has just been switched from the non-drive range to the drive range.

If the judgment result in Q4 is affirmative, the second speed gear used as the specific high-speed gear is set as target gear G1 in Q5. While a judgment is subsequently made in Q6 to determine whether the second speed gear has been set, the judgment result in this step is initially negative and, then, the operation flow proceeds to Q8, in which the target gear G1 is accomplished. The second speed gear is set since G1 is initially the second speed gear. Next, a flag Fmk is set to 1 in Q9 to indicate that the transmission 10 is currently set to the specific high-speed gear. After Q9, a judgment is made in Q10 to determine whether the manual mode is currently selected. If the judgment result in Q10 is affirmative, gear-shifting control operation in the manual mode is performed in Q11 as will be later described, whereas if the judgment result in Q10 is negative, gear-shifting control operation (automatic mode) according to the shifting characteristics is performed in Q12.

When the operation flow has returned to Q4 after once going through Q9, the judgment result in Q4 is then negative. At this time, a judgment is made in Q13 to determine whether a specified time period has elapsed after the switching from the non-drive range to the drive range. The specified time period of Q13 is set to a time period slightly longer than the time required for accomplishing the first speed gear after the second speed gear selected as the specific high-speed gear has been disengaged. The judgment result in Q13 is initially negative. At this time, the operation flow proceeds to Q6. If the judgment result in Q6 is affirmative, the first speed gear is set as the target gear G1 in Q7, and the operation flow proceeds to Q8, where the first speed gear is accomplished. After going through Q7 and Q8, the operation flow returns to Q13, and if the judgment result in Q13 is affirmative, the flag Fmk is reset to 0 in Q14.

Figure 12:
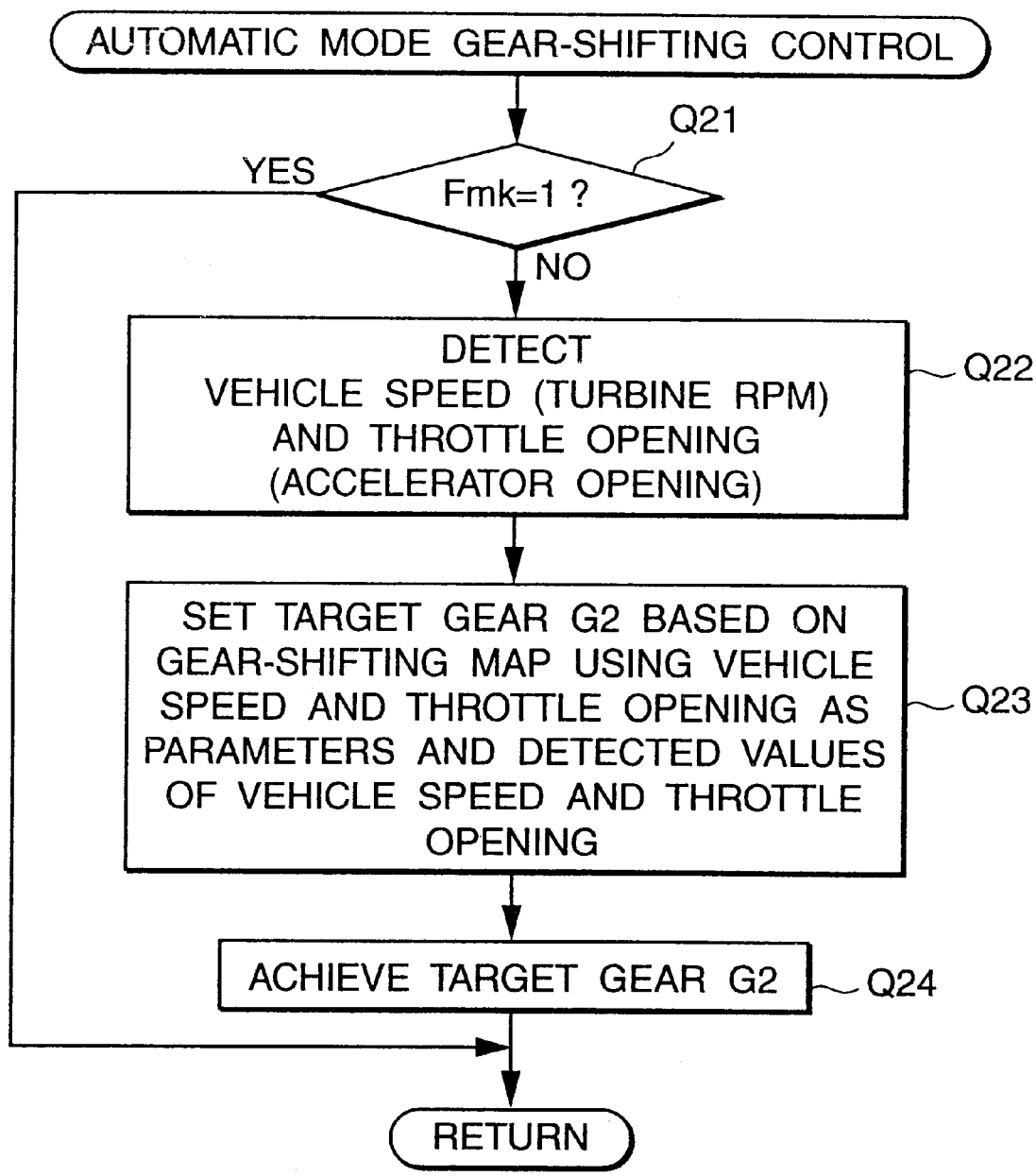
FIG. 12 is a flowchart showing an example of control operation according to the present invention.

FIG. 12 shows details of Q12 of FIG. 11. In FIG. 12, a judgment is made in Q21 to determine at first whether the flag Fmk is currently set to 1. If the judgment result in Q21 is affirmative, the transmission 10 is currently set to the second speed gear selected as the specific high-speed gear so that the operation flow returns directly to FIG. 11 (gear-shifting control operation in the automatic mode is substantially prohibited). If the judgment result in Q21 is negative, the vehicle speed and throttle opening are read in in Q22 and, then, target gear G2 is set in Q23 according to the shifting characteristics preset in relation to the vehicle speed and throttle opening which are used as parameters. Then, the target gear G2 is accomplished in Q24.

Figure 13:
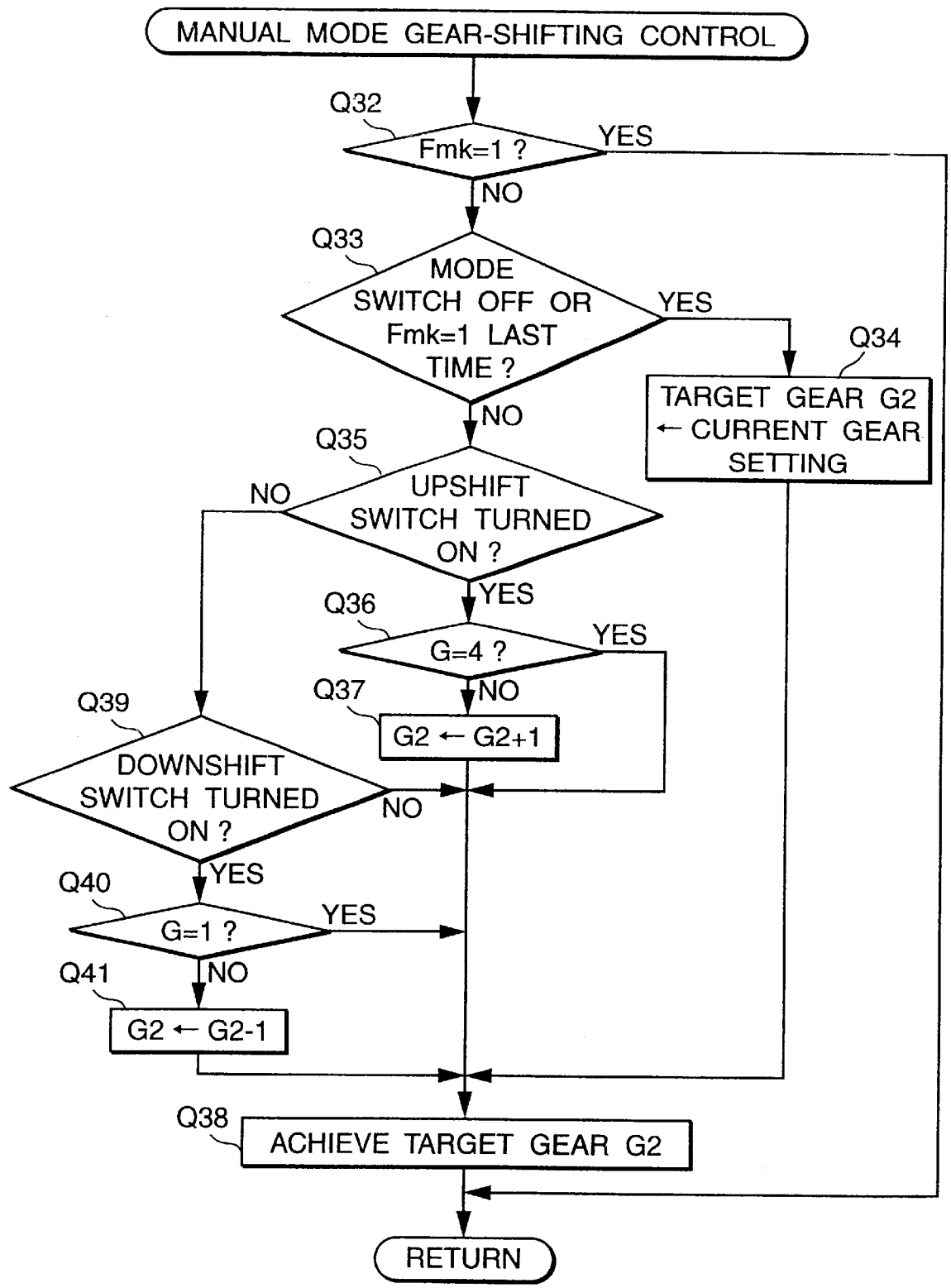
FIG. 13 is a flowchart showing an example of control operation according to the present invention.

FIG. 13 shows details of Q11 of FIG. 11. In FIG. 13, a judgment is made in Q32 to determine at first whether the flag Fmk is currently set to 1. If the judgment result in Q32 is affirmative, the transmission 10 is currently set to the second speed gear selected as the specific high-speed gear so that the operation flow returns directly to FIG. 11 (gear-shifting control operation in the manual mode is substantially prohibited).

If the judgment result in Q32 is negative, a judgment is made in Q33 to determine whether the manual mode was not last selected (this is identical to judge whether the flag Fmk was last set to 1). If the judgment result in Q33 is affirmative, a gear setting which has been accomplished immediately before the switching to the manual mode is set as the target gear G2. In a condition in which the transmission 10 was switched from the non-drive range to the drive range and has just been set to the first speed gear after once being set to the second speed gear selected as the specific high-speed gear, the target gear G2 is set to the first speed gear in Q34.

In Q35, a judgment is made to determine whether an upshift command has been given in the manual mode. If the judgment result in Q35 is affirmative, a judgment is made in Q36 to determine whether the current gear setting G is the fourth speed gear. If the judgment result in Q36 is negative, the current target gear G2 is changed to a one-step higher gear and this higher gear is set as a new target gear G2 in Q37 and, then, the newly set target gear G2 is accomplished in Q38. If the judgment result in Q36 is affirmative, the current gear setting G is the fourth speed gear so that no further upshift is possible. In this case, the operation flow bypasses Q37 and proceeds to Q38.

If the judgment result in Q35 is negative, a judgment is made in Q39 to determine whether a downshift command has been given in the manual mode. If the judgment result in Q39 is affirmative, a further judgment is made in Q40 to determine whether the current gear setting G is the first speed gear. If the judgment result in Q40 is negative, the current target gear G2 is changed to a one-step lower gear and this lower gear is set as a new target gear G2 in Q41 and, then, the newly set target gear G2 is accomplished in Q38. If the judgment result in Q40 is affirmative, the current gear setting G is the first speed gear so that no further downshift is possible. In this case, the operation flow bypasses Q41 and proceeds to Q38.

Figure 14:
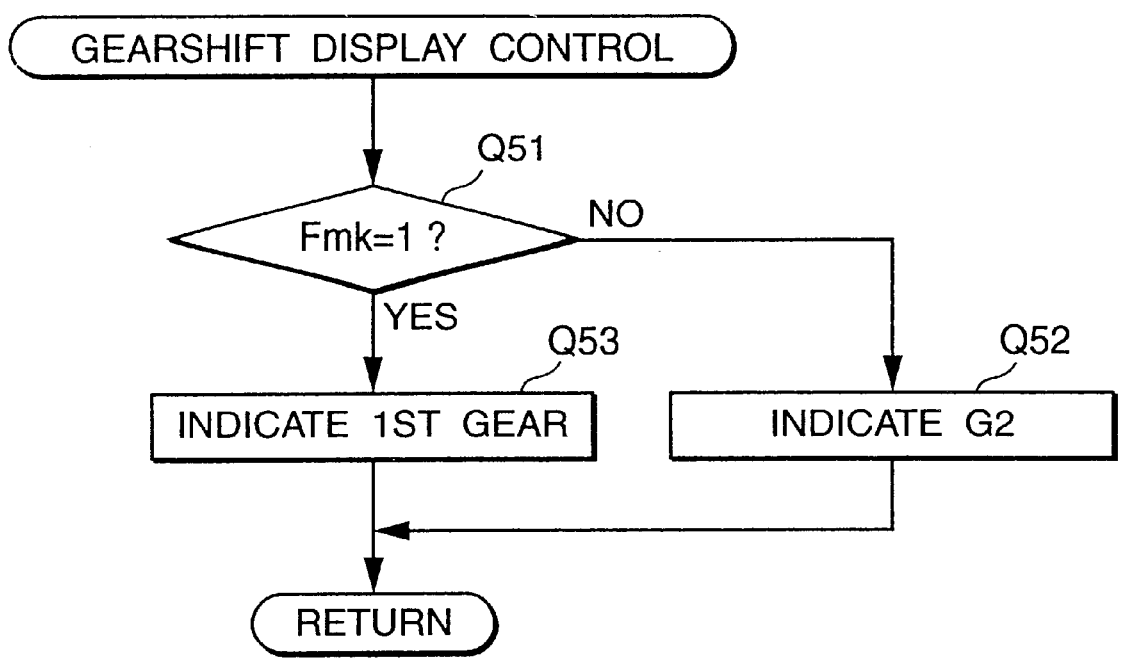
FIG. 14 is a flowchart showing an example of control operation according to the present invention.

FIG. 14 shows display control operation for the gearshift status display 67. First, a judgment is made in Q51 to determine whether the flag Fmk is currently set to 1. If the judgment result in Q51 is affirmative, the transmission 10 is currently set to the second speed gear selected as the specific high-speed gear. In this case, taking into consideration the fact that the transmission 10 is automatically shifted to the first speed gear in a moment as intended by the driver, a first speed gear readout is given in Q53. If the judgment result in Q51 is negative, the aforementioned target gear G2 is indicated.

FIG. 15 shows an example of variation of FIG. 13. First, a judgment is made in Q61 to determine whether the transmission 10 has just been switched to the manual mode. If the judgment result in Q61 is affirmative, a judgment is made in Q63 to determine whether the flag Fmk is currently set to 1. If the judgment result in Q63 is affirmative, the first speed gear is set as an initial gear G3 (an initial gear setting effective before any upshift command or downshift command is entered) from which any gear-shifting command is given in the manual mode in Q65. If the judgment result in Q63 is negative, a gear setting which has been accomplished immediately before the switching to the manual mode is set as the initial gear G3 in Q64.

If the judgment result in Q33 is negative, a judgment is made in Q67 to determine whether an upshift command has been given in the manual mode. If the judgment result in Q67 is affirmative, a judgment is made in Q68 to determine whether the current gear setting G is the fourth speed gear. If the judgment result in Q68 is negative, a judgment is made in Q69 to determine whether the aforementioned command is a first upshift command entered after the switching to the manual mode. If the judgment result in Q69 is affirmative, a gear setting one-step higher than the initial gear G3 is set as a new target gear G2 in Q71 and, then, the operation flow proceeds to Q66. Then, the target gear G2 is accomplished in Q66. If the judgment result in Q69 is negative, the current target gear G2 is changed to a one-step higher gear and this higher gear is set as a new target gear G2 in Q70 and, then, the operation flow proceeds to Q66.

If the judgment result in Q67 is negative, a judgment is made in Q72 to determine whether a downshift command has been given in the manual mode. If the judgment result in Q72 is affirmative, a further judgment is made in Q73 to determine whether the current gear setting G is the first speed gear. If the judgment result in Q73 is negative, a judgment is made in Q74 to determine whether the aforementioned command is a first downshift command entered after the switching to the manual mode. If the judgment result in Q74 is affirmative, a gear setting one-step lower than the initial gear G3 is set as a new target gear G2 in Q75 and, then, the operation flow proceeds to Q66. If the judgment result in Q74 is negative, the current target gear G2 is changed to a one-step lower gear and this lower gear is set as a new target gear G2 in Q76 and, then, the operation flow proceeds to Q66.

Although it is prohibited to maintain the current gear setting when the manual mode is selected while the transmission 10 is currently set to the second speed gear selected as the specific high-speed gear after the transmission 10 has been switched from the non-drive range to the drive range in the example of FIG. 15, gear-shifting operation itself in the manual mode is permitted. Considering that the driver would understand that the current gear setting is the first speed gear upon switching to the drive range, however, there is made an arrangement to set the initial gear G3 in Q64 and Q65 and use this initial gear G3 as a reference gear setting for a gear-shifting command entered for the first time in the manual mode, so that a gear setting assumed as being currently effective by the driver and an actually accomplished gear setting would be matched in actuality using gear-shifting operation in the manual mode. (As long as the transmission 10 is in the second speed gear selected as the specific high-speed gear upon proceeding to Q71 by way of Q65, the target gear G2 newly set in Q71 becomes the second speed gear which serves as the specific high-speed gear, so that the transmission 10 is not shifted to a higher gear in actuality.)

While the specific embodiment has so far been described, the invention is not limited thereto but includes the following variations, for example. The preset shifting characteristics to be used in the manual mode are not limited to those employing the engine load and vehicle speed as parameters, but conventionally known shifting characteristics, such as those preset in relation to the vehicle speed alone, or additionally employing road surface inclination as a parameter, for example, may be used as appropriate. Also, multiple sets of shifting characteristics may be prepared so that shifting characteristics to be used can be selected as appropriate depending on operating conditions of the vehicle, for instance.

The invention is not limited to a four-forward-speed automatic transmission but includes automatic transmissions featuring an appropriate number of gears, such as three-forward-speed or five-forward-speed types. The invention also includes an automatic transmission which allows stepwise gear selection by adapting a continuously-variable transmission mechanism. It is also possible to provide a first manual operating member for changing range positions and a second manual operating member for switching between the manual mode and the automatic mode as separate facilities. Furthermore, the present embodiment may be modified such that a manual operating member for entering upshift and downshift commands in the manual mode is provided at a steering wheel, for example, separately from the shift lever 51.

Moreover, the object of the invention is not limited to what has been specifically stated therein but implicitly includes the provision of what has been expressed therein as being substantially preferable or as advantage. Furthermore, it is possible to express the present invention as a control method.

Main features of the above-described control device of the automatic transmission can be summarized as follows.

A control device for an automatic transmission which is made manually switchable between automatic mode, in which gear-shifting operation is performed according to preset shifting characteristics, and manual mode, in which gear-shifting operation is manually performed by a driver, in a drive range comprises temporary high-speed gear setting means which causes the automatic transmission to accomplish first-speed gear after it has once been set to a specific high-speed gear other than first speed gear when switched from a non-drive range to the drive range, and priority means which gives priority to accomplishment of the first-speed gear by the aforementioned temporary high-speed gear setting means when the automatic transmission is switched to the aforementioned manual mode while it is set to the aforementioned specific high-speed gear by the aforementioned temporary high-speed gear setting means.

According to this control device, priority is given to the first-speed gear accomplished after the automatic transmission has once been set to the specific high-speed gear by the temporary high-speed gear setting means even when the manual mode is selected immediately after switching to the drive range. Therefore, it becomes possible to start off at the first speed gear. This control device is also preferable for avoiding awkward feeling which could be caused by the fact that a gear setting assumed as being currently effective by the driver differs from an actually accomplished gear setting.

If this control device further comprises gear setting holding means which maintains the gear setting already accomplished immediately before switching to the automatic mode until manual gear-shifting operation is performed by the driver when the automatic transmission has been switched from the aforementioned automatic mode to the aforementioned manual mode, and the aforementioned priority means has hold inhibiting means which inhibits retention of the gear setting by the aforementioned gear setting holding means while the automatic transmission is set to the aforementioned specific high-speed gear by the aforementioned temporary high-speed gear setting means, the automatic transmission is given an opportunity to be set to the first speed gear because it is not held at the specific high-speed gear even when switched to the manual mode immediately after switching to the drive range.

If the aforementioned priority means has inhibit means which inhibits gear shifting in the aforementioned manual mode while the automatic transmission is set to the aforementioned specific high-speed gear by the aforementioned temporary high-speed gear setting means, an opportunity to start off at the first speed gear is ensured.

If the aforementioned control device is set such that the aforementioned gear setting holding means maintains the gear setting at the first speed gear when the automatic transmission has been set to the first speed gear after once being set to the aforementioned specific high-speed gear by the aforementioned temporary high-speed gear setting means, it is possible to match the gear setting assumed as being currently effective by the driver with the actually accomplished gear setting while ensuring the opportunity to start off at the first speed gear in a reliable way.

Furthermore, if the aforementioned control device further comprises display means which displays a currently effective gear setting at least in the aforementioned manual mode, and the aforementioned display means indicates the first speed gear while the automatic transmission is set to the aforementioned specific high-speed gear by the aforementioned temporary high-speed gear setting means, the display means indicates the first speed gear without indicating the specific high-speed gear which is not intended by the driver, so that it becomes possible to prevent the display means from giving awkward feeling to the driver.

INDUSTRIAL APPLICABILITY

It becomes possible to avoid such a situation that an automatic transmission, which is designed to be set to first speed gear after it has once been set to a specific high-speed gear when switched to a drive range, is maintained at the specific high-speed gear when the transmission is switched to manual mode while it is in the specific high-speed gear. This makes it possible to start off at the first speed gear and the invention can be effectively applied to a vehicle equipped with an automatic transmission.

What is claimed is:

1. A control device for an automatic transmission which is manually switchable between an automatic mode, in which gear-shifting operation is performed according to preset shifting characteristics, and a manual mode, in which gear-shifting operation is manually performed by a driver, in a drive range, said control device comprising:

temporary high-speed gear setting means which sets the automatic transmission to a first-speed gear after having been set to a specific high-speed gear other than first speed gear when the automatic transmission is switched from a non-drive range to the drive range; and priority means which gives priority to setting to the first-speed gear by said temporary high-speed gear setting means when the automatic transmission is switched to said manual mode while it is being set to said specific high-speed gear by said temporary high-speed gear setting means.

2. A control device for an automatic transmission according to claim 1, further comprising:

gear setting holding means which holds the gear setting already realized immediately before switching to the manual mode until manual gear-shifting operation is performed by the driver when the automatic transmission has been switched from said automatic mode to said manual mode;

wherein said priority means has hold inhibiting means which inhibits holding of the gear setting by said gear setting holding means while the automatic transmission is set to said specific high-speed gear by said temporary high-speed gear setting means.

3. A control device for an automatic transmission according to claim 1, wherein said priority means has inhibiting means which inhibits gear shifting in said manual mode while the automatic transmission is set to said specific high-speed gear by said temporary high-speed gear setting means.

4. A control device for an automatic transmission according to claim 2, wherein said control device is set such that said gear setting holding means holds the gear setting at the first speed gear when the automatic transmission has been set to the first speed gear after once being set to said specific high-speed gear by said temporary high-speed gear setting means.

5. A control device for an automatic transmission according to one of claims 1 to 4, further comprising:

display means which displays a currently effective gear setting at least in said manual mode;

wherein said display means indicates the first speed gear while the automatic transmission is set to said specific high-speed gear by said temporary high-speed gear setting means.

* * * * *